2,907,796

PREPARATION OF VITAMIN A ACID AND VITAMIN A ALCOHOL

Howard C. Klein, Brooklyn, N.Y., assignor to Nopco Chemical Company, Harrison, N.J., a corporation of New Jersey No Drawing. Application June 12, 1957
Serial No. 665,129

5 Claims. (Cl. 260—617)

This invention relates to the preparation of vitamin A in a novel manner.

The synthesis of vitamin A has engaged the attention of the art since the structure of vitamin A was first disclosed by Karrer in 1933. Many routes for the synthesis of vitamin A have been advanced and a considerable body of literature has been developed concerning the preparation of vitamin A, vitamin A active materials and vitamin A intermediates. Because of the demand for vitamin A and the market which exists for this compound, efforts are constantly being made to devise new and improved methods both for the total synthesis of vitamin A and for the preparation of intermediate compounds which can be employed in the production of vitamin A.

One of the routes for obtaining vitamin A involves the conversion of the intermediate, vitamin A aldehyde, to vitamin A. This has been done by Wendler et al. J. Am. Chem. Soc. 72, 234 (1950) by treatment of vitamin A aldehyde with lithium aluminum hydride. However, lithium aluminum hydride is an expensive reagent and requires extensive precautions and careful handling at all times because it is a highly reactive material. It will react violently with water liberating hydrogen. It will even react with both the moisture and the carbon dioxide of the atmosphere, liberating hydrogen. Even in moisture free media it will react with occluded oxygen. Hence, adequate provisions must be made to store and use this reagent in a moisture and oxygen free condition. The use of dry apparatus and dry solvents is imperative.

Moreover, lithium aluminum hydride has toxic properties and should be handled under a hood. Provision must also be made for the speedy removal of hydrogen that may be generated. Not only is the hydrogen combustible, but, so is this compound.

Thus it can be seen that use of lithium aluminum hydride is a dangerous reagent that requires elaborate safeguards and careful manipulation. Clearly then, for adaptation to commercial procedures and even for its employment in the laboratory, it would be highly desirable if this reagent could be substituted by a reducing system which would be free of the aforementioned shortcomings.

Accordingly, it is an object of the present invention to provide an improved method for obtaining vitamin A.

It is a further object to provide for a process of obtaining vitamin A directly from vitamin A aldehyde.

It is a still further object to obtain vitamin A in a hazard free and less expensive manner than has heretofore been accomplished.

It is another object to prepare vitamin A from vitamin A aldehyde in a manner that has commercial utility and in a manner that calls for relatively simple apparatus and manipulation.

It is a further object to prepare vitamin A by use of a reducing system which will accomplish the reduction of the C=O function of vitamin A aldehyde, but will leave the vitamin A chromophoric system unaffected.

Further objects will become apparent from the detailed description given hereinafter. It is intended however, that the detailed description including the specific example is not limiting but merely indicates the preferred embodiments of this invention since various changes and modifications within the scope of the invention will become apparent to those skilled in the art.

It has been unexpectedly discovered that the above and other objects can be achieved by reacting vitamin A aldehyde with silver oxide to obtain vitamin A.

Briefly, this procedure is carried out as follows: To a solution of vitamin A aldehyde, there is added an aqueous alkaline suspension of silver oxide. After a period of vigorous agitation to insure maximum contact of the reaction components with the silver oxide, the solution is separated from the solids that are present and extracted with ether. The extracted phase contains vitamin A (vitamin A alcohol) in a highly pure state.

For a fuller understanding of the nature and objects of the present invention, reference is made to the following example which is given for the purpose of illustration and is not to be construed in a limiting sense.

Example

An aqueous suspension of silver oxide was prepared by mixing 0.15 gram of silver nitrate contained in 0.6 ml. of water with 0.07 gram of sodium hydroxide contained in 6 ml. of water. The pH of the suspension was about 10.5 to 11.5. To this suspension was added 50 mg. of vitamin A aldehyde which was dissolved in 2 ml. of ethanol. The resulting admixture was shaken vigorously at room temperature for two hours after which time a silver mirror was deposited. Thereafter the reaction mixture was filtered and the solids washed thoroughly with water and fresh ethanol. These washings were added to the filtrate. The filtrate was then diluted with water and extracted with diethyl ether. This ether or neutral fraction was analyzed spectroscopically and contained an ultra-violet absorption maximum at 3250 A. which corresponds to the known absorption maximum of vitamin A (vitamin A alcohol). Thus vitamin A aldehyde, the vitamin A progenitor, showed an ultraviolet absorption spectrum shift from 3800 A. to the new 3250 A. maximum. This marked hypsochromic shift indicated a conversion wherein the chromophoric system of six conjugated double bonds including a C=O function was reduced to a new chromophoric system of five conjugated double bonds with the C=O function converted to C—OH.

The alkaline fraction which remained after the above ether extraction was acidified with dilute hydrochloric acid and then extracted with ether. The ether was removed by evaporation and the crude product, dissolved in isopropanol, was analyzed spectroscopically. An ultraviolet absorption maximum at 3400 A. was observed which corresponds to the absorption maximum of vitamin A acid.

If desired, the concentration of the silver oxide suspension may be varied from 3 to 6 moles per mole of vitamin A aldehyde. Preferably, as indicated in the foregoing example, 5 moles of silver oxide per mole of aldehyde is used. The reaction between the aldehyde and silver oxide is carried out at room temperature with vigorous agitation for from 1 to 3 hours. Elevated temperatures should be avoided as the reactants under consideration are sensitive to heat. Generally, two hours' reaction time is sufficient. However, when metallic silver is formed, i.e., a silver mirror is deposited upon the walls of the reaction vessel, the reaction is complete.

The silver oxide employed herein may be prepared in any convenient manner. However, during reaction with the aldehyde, sufficient caustic soda, or other water-soluble hydroxide must be present to insure a pH of between about 10.5 and 11.5. Hence, it is advantageous to prepare a silver oxide suspension by treatment of a silver salt with an excess of a soluble hydroxide thereby providing for the proper pH.

The yields of vitamin A (vitamin A alcohol) and vitamin A acid are obtained in approximately equal quantities, as estimated by ultra-violet spectrographic analysis. However, this is not a serious disadvantage, because the first ether extraction completely separates all of the vitamin A, leaving behind the sodium salt of vitamin A acid in the aqueous phase. Vitamin A acid is itself a vitamin A intermediate, and is readily converted to vitamin A.

As the foregoing has demonstrated, a novel process for obtaining vitamin A from vitamin A aldehyde has been found. This process calls for the conversion of the aldehyde with a relatively inexpensive reducing system when compared with the prior art. Reaction conditions are mild and recovery of the product in a good state of purity is accomplished. There are no hazards involved and consequently the precautionary measures necessary when carrying out the teachings of the prior art are avoided.

It will be appreciated that various modifications can be made in this invention as described above and such are within the scope of the present invention as defined in the appended claims.

Having described my invention, what I claim as new and desire to secure by Letters Patent is:

1. A process for obtaining vitamin A alcohol which comprises reacting vitamin A aldehyde with silver oxide under alkaline conditions with vigorous stirring and thereafter recovering vitamin A alcohol from the reaction mixture.

2. A process for obtaining vitamin A alcohol which comprises reacting at room temperature vitamin A aldehyde with silver oxide under alkaline conditions with vigorous stirring and thereafter recovering vitamin A alcohol from the reaction mixture.

3. A process for obtaining vitamin A alcohol which comprises reacting one mole of vitamin A aldehyde with from 3 to 6 moles of silver oxide under alkaline conditions at room temperature with vigorous agitation and thereafter recovering vitamin A alcohol from the reaction mixture.

4. A process for obtaining vitamin A alcohol which comprises admixing one mole of vitamin A aldehyde with from 3 to 6 moles of silver oxide under alkaline conditions, thereby forming a reaction mixture, vigorously agitating said reaction mixture at room temperature and at a pH of from 10.5 to 11.5 and thereafter recovering vitamin A alcohol from the reaction mixture.

5. A process for obtaining vitamin A alcohol which comprises reacting 5 moles of silver oxide with one mole of vitamin A aldehyde at room temperature and at a pH of 10.5 to 11.0 for two hours while vigorously agitating said reactants, and thereafter recovering said vitamin A alcohol.

References Cited in the file of this patent

UNITED STATES PATENTS 2,676,990     Humphlett et al.     Apr. 27, 1954

OTHER REFERENCES

Goldberg et al.: Jour. Chem. Soc. (1928), p. 2355.